United States Patent [19]

Hujimoto et al.

[11] 4,333,131
[45] Jun. 1, 1982

[54] HEADLIGHT MOUNTING AND ADJUSTMENT MECHANISM

[75] Inventors: Yoshio Hujimoto, Hiroshima; Tadashi Kochi, Fuchu; Shigeru Furuya, Yokohama, all of Japan

[73] Assignees: Toyo Kogyo Co., Ltd., Aki; Stanley Electric Co., Ltd., Tokyo, both of Japan

[21] Appl. No.: 146,119

[22] Filed: May 2, 1980

[30] Foreign Application Priority Data

May 10, 1979 [JP] Japan ............................ 54-62211[U]

[51] Int. Cl.³ ............................................ F21V 19/02
[52] U.S. Cl. ........................................ 362/372; 362/80; 362/275; 362/287; 362/289; 362/419
[58] Field of Search .............. 362/287, 80, 289, 275, 362/372, 419

[56] References Cited

U.S. PATENT DOCUMENTS 4,188,655  2/1980  Tallon et al. ........................ 362/80

Primary Examiner—Stephen J. Lechert, Jr.
Attorney, Agent, or Firm—Wenderoth, Lind & Ponack

[57] ABSTRACT

A headlight mounting and adjustment mechanism particularly suited for use in a motor vehicle for adjusting the direction in which the headlight is aimed includes a headlight assembly elastically yieldably supported by a headlight support at one location. A dual adjustment device is provided for effecting the up-and-down or vertical adjustment and also the left-to-right or horizontal adjustment of the headlight assembly. The dual adjustment device includes a sliding block supported for sliding movement between front and rear positions by a guide wall structure fixedly attached to the headlight support, and the sliding block has a bearing projection operatively and rotatably coupled to the headlight assembly, a horizontal adjusting bolt member threadingly extended through the slide block and received by the headlight support, and a vertical adjusting bolt member having one end coupled to the headlight assembly and the other end threadingly engaged with the sliding block or the headlight support so that by turning the vertical adjusting bolt member the up-and-down adjustment of the headlight assembly is achieved.

7 Claims, 3 Drawing Figures

HEADLIGHT MOUNTING AND ADJUSTMENT MECHANISM

BACKGROUND OF THE INVENTION

The present invention relates to a headlight mounting and adjustment mechanism and, more particularly, to a device for adjusting the direction in which at least one headlight is aimed.

As is well known to those skilled in the art, it is important for automobile headlights to be aimed correctly. If they are aimed too high or to the left, the headlights might blind an oncoming driver and, this light blinding could, cause a serious automobile accident. However, an accident could occur even if the headlights are aimed too low or to the right, because, although the headlights may not blind an oncoming driver, the driver of the automobile will not be able to see objects at a distance ahead of him. Thus, incorrect aiming of the headlights reduces the driver's ability to see the road properly at night.

Accordingly, automobile headlights are required to have the capability of vertical and horizontal aiming adjustment not only for the automobile manufacturer's expediency, but also for the purpose of the occasional adjustment to be performed by the automobile user or a mechanic of an automobile repair station. In general, this headlight adjustment is effected to the headlight assemblies relative to a headlight support which may be a part of the automobile front body structure or a headlight housing which is fixedly attached to the front body structure.

In most automobiles, a headlight assembly comprises reflector having one or more lamps and a lens positioned frontwardly of the lamps, and the reflector is rigidly mounted on the headlight support, for example, the automobile front body structure, through a plurality of spaced bolt members thereby forming a device for the adjustment of the headlight direction and concurrently used to secure the reflector to the front body structure.

According to the prior art, the headlight adjustment is carried out by adjusting the extension of the bolt members, and the substantially simultaneous adjustment of some of the bolt members is required even when the headlight is desired to be adjusted correctly in only one direction. In this way, the prior art headlight adjustment mechanism requires a relatively complicated and time-consuming procedure for adjustment and, yet, this complicated and time-consuming procedure is often amplified in view of the fact that the adjustment of some of the bolt members causes a movement of the reflector in a direction diagonally of the vertical and horizontal directions.

SUMMARY OF THE INVENTION

Accordingly, the present invention has been developed so as to substantially eliminate the disadvantages and inconveniences inherent in the prior art headlight mounting and adjustment mechanisms and is intended to provide an improved adjusting device for the adjustment of the headlight direction, and the device is simple in construction and easy to operate because the headlight adjustment in both the vertical and horizontal directions can be effected substantially at one location which is adjacent the reflector.

Another important object of the present invention is to provide an improved device of the type referred to above, which device allows the headlight assembly to be easily installed relative to the headlight support because of the reduced number of fastening elements used to connect the headlight assembly to the headlight support as compared to the prior art.

A further object of the present invention is to provide an improved device of the type referred to above, which is relatively cheap to manufacture.

To this end, according to the present invention, at least one headlight assembly comprises a generally frustum-shaped, reflector having at least one lamp removably positioned therein in a manner known to those skilled in the art, and a pair of spaced mounting stays laterally outwardly protruding from the reflector of the construction described above is supported for adjustment relative to and by a headlight support, for example, a housing fixedly attached to an automobile front body structure in such a manner that one of the mounting stays is fixed to the reflector and is connected to the headlight support by a threaded connecting member while another or second mounting stay is elastically yieldingly connected to a sliding block. The sliding block is supported within a guide wall structure which is rigidly secured to the headlight support, and the slide block is supported for movement between front and rear positions within the guide wall structure. A horizontal adjustment bolt member threadably extends through the sliding block and is rotating but axially non-movably secured to the headlight support, so that, by rotating the horizontal adjusting bolt member in the appropriate direction, the sliding block can be moved between the front and rear positions for left-to-right or horizontal adjustment of the reflector. For the purpose of the up-and-down or vertical adjustment of the reflector, a vertical adjusting bolt member extends through the second mentioned mounting stay and is adjustably threaded into the sliding block for, when the vertical adjusting bolt member is turned in either direction, forcing the second mentioned mounting stay to pivot about the point of connection of the second mentioned mounting stay to the sliding block to tilt the reflector upwardly or downwardly.

Preferably, the mounting stays are oppositely positioned with respect to each other so that the headlight assembly can steadily be supported by the headlight support after the headlight adjustment has been performed.

BRIEF DESCRIPTION OF THE DRAWINGS

These and other objects and features of the present invention will become apparent from the following description taken in conjunction with a preferred embodiment thereof with reference to the accompanying drawings, in which.

DETAILED DESCRIPTION OF THE INVENTION

Figure 1:
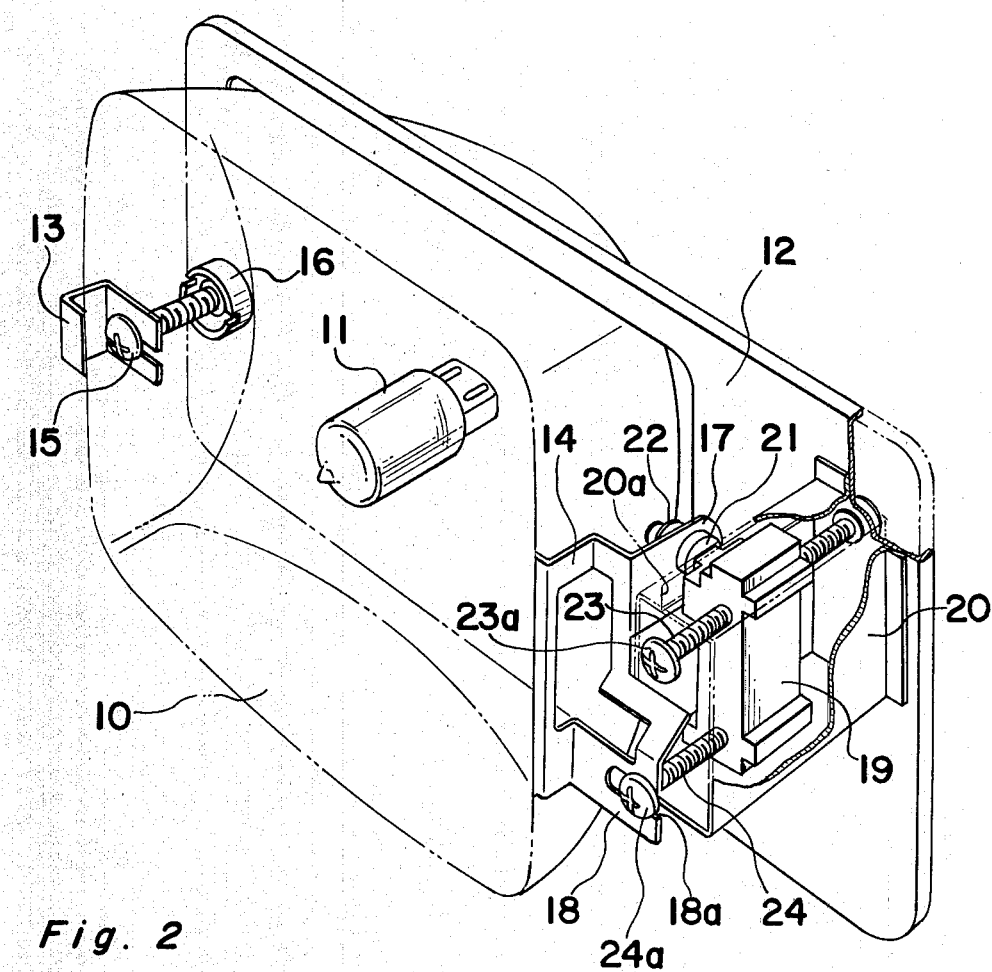
FIG. 1 is a partially cutaway perspective view of a headlight mounting and adjustment mechanism according to the present invention with a reflector shown in phantom.

Before the description of the present invention proceeds, it is to be noted that like parts are designated by like reference numerals throughout the accompanying drawings.

Referring to the accompanying drawings, a headlight mounting and adjustment mechanism comprises a generally frustum-shaped reflector or headlight assembly 10, shown by the phantom lines, having a lamp or light 11 removably fixed at a location corresponding to or adjacent the apex of the frustum in any manner known to those skilled in the art. The reflector 10 is secured to a headlight support 12 in a manner as will be described in detail later, said headlight support 12 being shown in the form of a housing.

The reflector 10 has a pair of spaced mounting stays 13 and 14 laterally outwardly protruding from the reflector at a location corresponding to the base of the frustum. These mounting stays 13 and 14 are preferably positioned in opposition to each other and are welded to, or otherwise integrally formed with, the peripheral edge of the reflector 10 at a position adjacent the opening or base of the reflector 10. So far illustrated, the stay 13 is formed of a metal strip having one end fixed to the reflector 10 and the stay 13 is bent to assume a substantially U-shaped configuration with the other end thereof protruding laterally towards the reflector 10. When the stay 13 of the shape described above and shown is utilized, the employment of any known welding technique is preferred for connecting the stay 13 to the reflector. However, when the stay 13 is formed with said other end thereof laterally protruding in a direction away from the reflector, the stay 13 may be either welded to the reflector 10 or formed integrally therewith.

Figure 3:
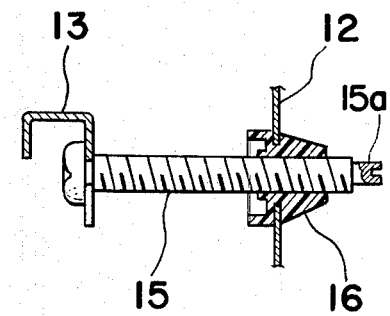
FIG. 3 is a longitudinal sectional view of a threaded connecting member used to secure the reflector to the headlight support.

The stay 13 is, as best shown in FIG. 3, mounted on a threaded connecting member 15 which has one end rotatably but axially non-movably connected to the stay 13, and the other end of the member 15 is threaded into and elastically yieldably received by an elastic bearing block 16 rigidly secured to the headlight support 12 in any known manner. One purpose of the elastic bearing block 16 is to permit the threaded connecting member 15 to tilt with respect to a vertical plane and a horizontal plane when the headlight adjustment mechanism is effected in a manner as will subsequently be described. It is to be noted that threading of the connecting member 15 into the elastic bearing block 16 can be accomplished by turning the connecting member 15 by the use of a screw driver engageable in a groove 15a formed at one end of the connecting member 15 opposite to the head portion thereof and remote from the stay 13. Alternatively, it may be possible to adjust the connecting member 15 by the use of a rod if the connecting member 15 is formed with a radially extending hole for receiving the rod.

The stay 14 opposite to the stay 13 has a pair of tongues 17 and 18, the tongue 17 extending in a direction generally parallel to the axis of the opening of the reflector 10 and parallel to the direction in which the headlight assembly is aimed, whereas the tongue 18 extends laterally outwardly from the reflector 10 and in a direction perpendicular to the direction in which the tongue 17 extends. The tongues 17 and 18 have a mounting aperture 17a and a generally U-shaped recess 18a respectively.

Figure 2:
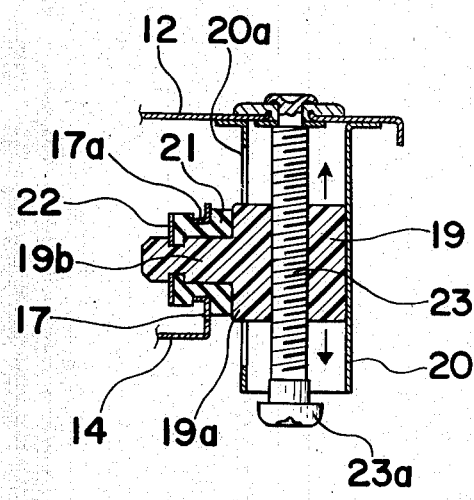
FIG. 2 is a longitudinal sectional view of an essential portion of the headlight mounting adjustment mechanism shown in FIG. 1, showing sliding block connected to a horizontal adjusting bolt member and one of the mounting stays for mounting the reflector.

Positioned adjacent the stay 14 and operatively supported by the headlight support 12 is a generally rectangular sliding block 19. This sliding block 19 is housed within a generally elongated guide wall structure 20 for sliding movement between front and rear positions and has rib 19a and, as best shown in FIG. 2, a bearing projection 19b, both integrally formed therewith or otherwise rigidly connected thereto. The rib 19a laterally extends in a direction parallel to the direction of movement of the sliding block 19 and protrudes longitudinally outwardly from the sliding block toward the tongue 17. The bearing projection 19b extends longitudinally outwardly from the rib 19a in a direction perpendicular to the direction of movement of the sliding block 19. As best shown in FIG. 2, an elastic bushing 21 made of any suitable rubber material is mounted on the bearing projection 19b for the purpose as will become clear from the subsequent description, said elastic bushing 21 being held in position on the bearing projection 19b by a stop washer 22 which is mounted in any known manner on the bearing projection 19b on a side of the elastic bushing 21 remote from the slide block 19.

The guide wall structure 20 is rigidly secured at one end thereof to the headlight support 12 in any known manner, for example, by the use of a known welding technique or a known rivetting technique and longitudinally extends therefrom in a direction parallel to the direction in which the headlight assembly is aimed. This guide wall structure 20 is composed of a pair of opposed lateral side walls having a large space therebetween and a pair of opposed longitudinal side walls having a small space therebetween, the four walls being assembled to form the guide wall structure 20 so as to assume a generally rectangular cross section. In this guide wall structure 20, one of the longitudinal side walls facing the stay 14 is formed with a guide slot 20a extending in a direction parallel to the direction of movement of the slide block 19 between the front and rear positions.

While the guide wall structure 20 is constructed as hereinbefore described, the slide block 19 is movably housed within the guide wall structure 20 with the rib 19a accommodated in the guide slot 20a and with the bearing projection 19b protruding outwardly from the guide wall structure 20, as best shown in FIG. 2. The bearing projection 19b is inserted through the bearing aperture 17a in the tongue 17 in such a manner that the peripheral edges defining the bearing aperture 17a contact the elastic bushing 21 mounted on such bearing projection 19b. It is to be noted that the stop washer 22 is mounted on the bearing projection 19b after the bearing projection 19b has been inserted through the bearing or mounting aperture 17a in the tongue 17 with the elastic bushing 21 mounted either in the bearing aperture 17a or on the bearing projection 19b. The elastic bushing 21 serves to elastically yieldably connect the stay 14, specifically the tongue 17, to the sliding block 19 in order to accommodate the movement of the tongue 17 in a plane parallel to the longitudinal axis of the bearing projection 19b which may take place during the horizontal adjustment.

For the purpose of the horizontal adjustment, a horizontal adjusting bolt member 23 is employed. This adjusting bolt member 23 has a head portion 23a which is accessible by a screw driver and which extends threadingly through the sliding block 19, the free end of said adjusting bolt member 23 being rotably but axially non-movably connected to the headlight support 12 in a manner as best shown in FIG. 2. Because the sliding block 19 is confined within the guide wall structure 20, a turning of the adjusting bolt member 23 is either direction results in the movement of the sliding block 19 between the front and rear positions. This movement of the sliding block 19 is transmitted to the reflector 10 through the bearing projection 19b by way of the tongue 17 so that the direction in which the headlight assembly is aimed in a horizontal plane can be adjusted.

For the purpose of the vertical adjustment, a vertical adjusting bolt member 24 is employed. This adjusting bolt member 24 has a head portion 24a accessible by a screw driver, an end portion of the bolt member 24 adjacent the head portion 24a being engaged in the bearing recess 18a in the tongue 18. The engagement of that portion of the bolt member 24 in the bearing recess 18a is preferably such as to permit the rotation of the bolt member 24 about the longitudinal axis thereof but not the axial movement of the bolt member 24 relative to the tongue 18. However, in view of the employment of the elastic bearing block 16 which enables the threaded connecting member 15 to assume a tilted position relative to the headlight support 12, the peripheral edge portion of the tongue 18 defining the recess 18a can be held constantly in engagement with the head portion 24a of the bolt member 24 irrespective of the position of the headlight assembly in the horizontal plane.

The vertical adjusting bolt member 24 extends so as to be in parallel relation to the horizontal adjusting bolt member 23, and bolt member 24 has its free end portion adjustably threaded into the sliding block 19 as best shown in FIG. 1. It will readily be seen that, by turning the adjusting bolt member 24 in either direction, the tongue 18 of the stay 14 can be drawn towards or away from the sliding block 19 irrespective of the position of the sliding block 19, with the tongue 17 consequently rotating a certain angle about the longitudinal axis of the bearing projection 19b. Thus, the lighting direction of the headlight assembly in a vertical plane can be adjusted.

It is to be noted that the sliding block 19 may be made of any known rigid material, however, the use of a hard synthetic resin is preferred because of its light-weight and inexpensive features. It is also to be noted that, although the guide wall structure 20 has been described as having the guide slot 20a defined in one of the opposed, longitudinal side walls thereof, it may be constructed of a generally rectangular metallic plate by folding it so as to assume a generally C-shaped cross section with the spaced ends of the rectangular metallic plate defining the guide slot 20a. In addition, in order that the headlight assembly can steadily be supported relative to the headlight support 12, the stay 14, in opposition to the stay 13, is preferably located such that the tongues 17 and 18 thereof are positioned on respective sides of the imaginary center line or axis which divides the reflector 10 into upper and lower halves.

From the foregoing description of the present invention, it is now clear that, by turning the horizontal adjusting bolt member 23 causing the sliding block 19 to move between the front and rear positions along the horizontal adjusting bolt member 23, the reflector 10 can be pivoted in the horizontal plane about the point of connection of the threaded connecting member 15 to the elastic bearing block 16. On the other hand, by turning the vertical adjusting bolt member 24 varying the depth to which the vertical adjusting bolt member 24 is threadingly inserted into the sliding block 19, the stay 14 can be pivoted about the longitudinal axis of the bearing projection 19b thereby causing the reflector 10 to pivot in the vertical plane about an imaginary pivot line or axis between the point of connection of the threaded connecting member 15 to the elastic bearing block 16 and the point of pivot of the tongue 17 about the longitudinal axis of the bearing projection 19b. It is to be noted that the turning of the vertical adjusting bolt member 24 in either direction results in no substantial axial movement of the sliding block 19.

Although the present invention has fully been described in connection with the preferred embodiment thereof with reference to the accompanying drawings, it is to be noted that various changes and modifications are apparent to those skilled in the art. For example, although the reflector 10 is shown as having an opening which is circumferentially generally rectangular in shape, it may have a generally circular shape. In addition, although the vertical adjusting bolt member 24 has been described and shown as being threadably engaged with the sliding block 19, it may extend either loosely through or completely clear of the slide block 19 and be threadably engaged with the headlight support 12 through an elastic bearing block similar to the block 16. When, as just described, the vertical adjusting bolt member 24 extends between the tongue 18 and the headlight support 12 clear of the sliding block 19, the sliding block 19 must have a lateral width smaller than that shown in FIG. 1 so as to form a clearance between one end face of the sliding block 19 and one of the longitudinal side walls of the guide wall structure 20 adjacent the vertical adjusting bolt member 24. Moreover, a compression spring may be mounted on the vertical adjusting bolt member 24 between the tongue 18 and the sliding block 19 or between the tongue 18 and the headlight support 12.

Any other changes and modifications are understood to be within the spirit and scope of the present invention unless they depart therefrom.

We claim:

1. A headlight mounting and adjustment mechanism comprising:
   a headlight assembly for housing an electric light which when energized emits a beam of light in a direction;
   a headlight support fixedly positioned with respect to said headlight assembly;
   a first connecting means operatively associated with a first portion of said headlight assembly and said headlight support for pivotally connecting said headlight assembly to said headlight support;
   a sliding block supported for movement toward and away from said headlight support and between first and second positions;
   a guide means fixedly connected to said headlight support for slidably supporting said sliding block during movement between said first and second positions;
   a second connecting means operatively associated with a second portion of said headlight assembly and said sliding block for rotatably mounting said headlight assembly on said sliding block and for rotatably supporting said headlight assembly relative to said sliding block about an axis extending between the pivotal connection of said headlight assembly to said headlight support and the rotatable mount of said headlight assembly to said sliding block;

a first adjusting member operatively associated with said sliding block and said headlight support for sliding said sliding block for pivoting said headlight assembly about the pivotal connection of said headlight assembly to said headlight support; and a second adjusting member operatively associated with a third portion of said headlight assembly and said sliding block for varying the distance between said third portion and said sliding block for rotating said headlight assembly about said axis.

2. A headlight mounting and adjustment mechanism as claimed in claim 1, wherein:

said first adjusting member is threadably engaged with said sliding block;

said first portion is located along a first peripheral edge of said headlight assembly;

said second portion and said third portion are located along a second peripheral edge of said headlight assembly; and the first and second peripheral edges are opposite edges of said headlight assembly.

3. A headlight mounting and adjustment mechanism as claimed in claim 1, wherein said first connecting means comprises:

a first mounting stay attached to said first portion;

a resilient bearing block made of elastic material and rigidly mounted on said headlight support; and a connecting member threadably engaged with said resilient bearing block and rotatably and axially non-movably connected to said first mounting stay.

4. A headlight mounting and adjustment mechanism as claimed in claim 1, wherein:

said second connecting means comprises a second mounting stay attached to said second portion and said third portion, a first tongue connected to said second mounting stay and rotatably mounted on said sliding block and extending in one direction substantially parallel to the direction of a beam of light from said headlight assembly, and a second tongue connected to said second mounting stay and extending in a direction substantially perpendicular to said one direction; and said second adjusting member is rotatably and substantially axially non-movably connected to said second tongue for, when rotated in a first direction, moving said second tongue and said third portion toward said sliding block and rotating said headlight assembly relative to said sliding block and for, when rotated in a second direction, moving said second tongue and said third portion away from said sliding block and rotating said headlight assembly relative to said sliding block.

5. A headlight mounting and adjustment mechanism as claimed in claim 4, wherein:

said sliding block has a bearing projection axially extending in a direction substantially perpendicular to the longitudinal axis of said first adjusting member; and said first tongue is rotatably mounted on said bearing projection.

6. A headlight mounting and adjustment mechanism as claimed in claim 1, 2, 3 or 4, wherein:

said guide means is an open-ended member having a box-like shape; and said sliding block is movably housed within said guide means.

7. A headlight mounting and adjustment mechanism as claimed in claim 3, wherein:

said second connecting means comprises a second mounting stay attached to said second portion and said third portion, a first tongue connected to said second mounting stay and rotatably mounted on said sliding block and extending in one direction parallel to the direction of a beam of light from said headlight assembly, and a second tongue connected to said second mounting stay and extending in a direction substantially perpendicular to said one direction;

said resilient bearing block biases said third portion and said second tongue away from said sliding block; and said second adjusting member is rotatably connected to said second tongue for, when rotated in a first direction, moving said second tongue and said third portion toward said sliding block and rotating said headlight assembly relative to said sliding block and for, when rotated in a second direction, resulting in movement of said second tongue and said third portion away from said sliding block and resulting in rotation of said headlight assembly relative to said sliding block.

* * * * *